United States Patent Office 3,480,986
Patented Dec. 2, 1969

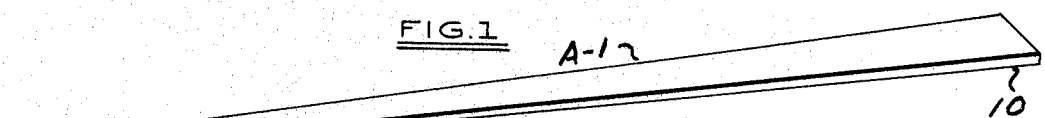
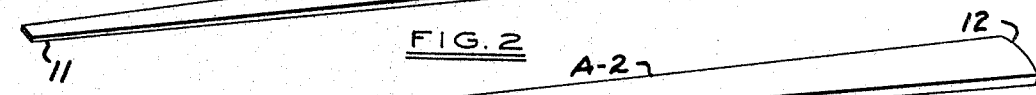
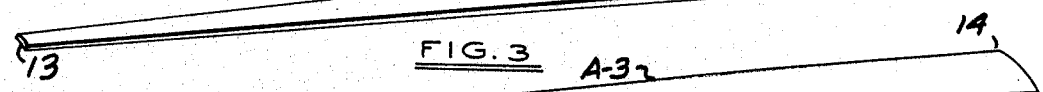
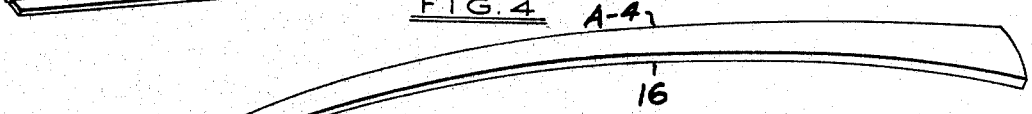
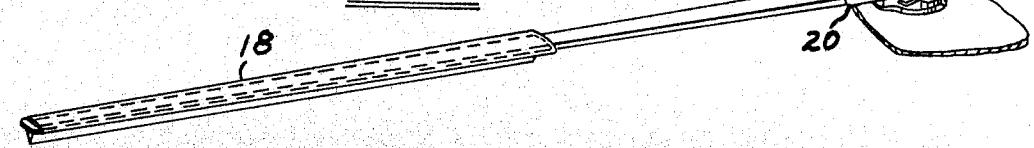
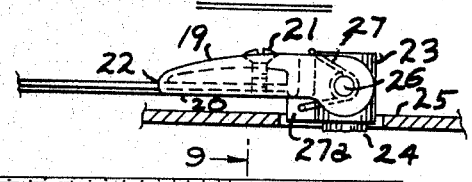
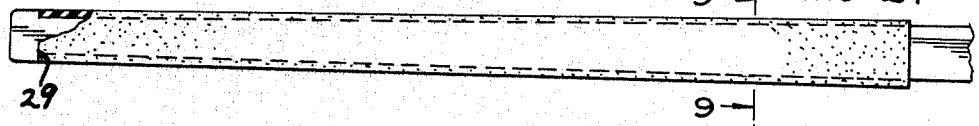

3,480,986
INTEGRAL WINDSHIELD WIPER AND ARM
CONSTRUCTION
Lloyd M. Forster, Bloomfield Hills, Mich., assignor of one-third to Walter D. Appel and two-thirds to Forster and Slaughter
Filed Sept. 16, 1966, Ser. No. 580,017
Int. Cl. B60s 1/36
U.S. Cl. 15—250.36                            9 Claims

ABSTRACT OF THE DISCLOSURE

An integral single leaf spring windshield wiper and arm construction adapted to provide a predetermined uniform wiper contact pressure with a predetermined operating configuration, the leaf spring having a tapered width, transverse crown and a free-state continuous arc, longitudinal, gradual, unidirectional curvature involving a complex variable section modulous, the free-form longitudinal curvature corresponding to that produced by deflection from a reverse uniform load applied along a predetermined portion of a similar leaf spring having a free-state longitudinal configuration coresponding to the desired predetermined operating configuration, the loaded portion comprising that of the leaf spring directly engaged by the wiper element.

---

This invention relates to an integral widshield wiper and arm construction and more particularly to a single leaf spring widshield wiper arm adapted to directly mount a rubber windshield wiper element, apply uniform pressure loading thereto against a windshield surface, and transmit wiping movement thereto directly from a pivoted driveshaft.

Present automotive and like vehicles use a wiper arm construction which applies pressure to the center of a wiper blade assembly and which transmits motion thereto across the surface of the vehicle windshield from a power actuated hub at one end. The conventional wiper arm is essentially an enclosed sheet metal box of tapering dimension connected to a heavy rigid metal strip. Each arm is fastened to a drive means at one end, which oscillates back and forth, and it is pivotally connected to a wiper blade assembly at the other end. Within the box sectioned part is a tensioning spring which reacts between the drive hub and a fitting in a box section to exert the necessary pressure to the wiper blade for proper windshield wiping action.

Although this basic wiper arm construction has been in use for many years, with but minor changes, there are a number of objectionable aspects and limitations which are of growing concern. For example, the spring biasing mechanism, box section and projecting strip are unduly complicated and expensive to manufacture and assemble and provide a bulky and objectionably conspicuous assemblage. The frontal and side faces of the box section provide a substantial surface for wind reaction at high speeds that reduces the effective blade pressure and interferes with proper wiping action. When typical bright metal surfaces are used, sun reflection may interfere with the driver's vision.

In a preferred embodiment of the present integral wiper arm construction a rubber wiping element is mounted directly on the leaf spring arm which is tapered both in thickness and in width from a maximum at the drive shaft end to a minimum at the remote end of the wiping element and may be provided with a uniform radius transverse crown adding bending stiffness where desired. The rubber wiping element is preferably molded with an integral matching tapered rubber sleeve adapted to slip over the essentially flat leaf spring so that upon replacement only the rubber wiping element per se need be changed.

These and other objects of the invention may best be understood from the following description of the preferred embodiment as illustrated in the drawings wherein:

FIGURES 1–4 are perspective views of progressive stages in the development of a prototype leaf spring blank constructed in accordance with the present invention.

FIGURE 5 is an end view of the leaf spring as shown in FIG. 2.

FIGURE 6 is a perspective view of a complete wiper arm assembly as installed on the cowling of a vehicle for operation on the windshield (not shown).

FIGURE 7 is an enlarged fragmentary side elevation of the drive shown in FIG. 6.

FIGURE 8 is a fragmentary plan view of the rubber wiping end portion of the arm shown in FIG. 6.

FIGURE 9 is a sectional view taken along the line 9—9 of FIG. 8.

Referring to FIG. 1 a prototype leaf spring blank A–1 is shown tapered in width and thickness from a maximum at the drive end 10 to a minimum at the extreme of the wiping end 11. In a typical installation employing a stainless spring steel wherein an arm of 27 inches total length is required to distribute a total load of 28 ounces uniformly over an 18 inch rubber wiping element a width of 5/8 inch at the wide end tapering uniformly to 3/8 inch at the narow end, and from .035 inch thickness at the end 10 tapering uniformly to .005 inch at the thin end 11, are appropriate dimensions for adequate strength bending to flexion and uniform load distribution.

As shown in FIGURES 2 and 5 a slight transverse crown, preferably of uniform radius such as to provide a total crowned thickness at the wide end of the arm of approximately twice material thickness, may be employed to provide additional arm stiffness. Such prototype arm A–2 as illustrated in FIG. 2 is next temporarily positioned on the windshield of a vehicle to which the wiper arm is ultimately to be applied with reference to the drive shaft position and is provided with any slight longitudinal curvature in its lowermost at rest position on the windshield corresponding to any transverse windshield curvature. With allowance for the thickness of the rubber wiping element this will represent the configuration of the leaf spring per se as installed with uniform pressure loading on the windshield.

After recording the desired longitudinal curvature of the installed wiper arm configuration on a template or otherwise the prototype leaf spring is experimentally provided next with a substantial additional free-form curvature such as shown in FIG. 4 which will when turned over and loaded in a horizontal position uniformly between points 16 and 17 corresponding to the location of the rubber wiper element 18 in the final installation while the wide end is rigidly clamped in a vise or otherwise cause the loaded leaf spring to deflect to an operating curvature corresponding to that of FIG. 3. The required free-form curvature may thus be determined experimentally by providing more or less free-form curvature as required along the entire length whereupon such finally determined free-form curvature may be further recorded and duplicated by suitable production means such as cam controlled rollers which may be programmed to provide the desired longitudinal curvature to match that of the prototype.

The wide end of the spring arm is preferably installed in a die cast drive adapter 19 having shouldered flanges 20 snugly engaging the side edges of the spring arm and retained by a screw 21 threaded into the end of the spring arm which, cooperating with the fulcrum end 22 of the adapter, may be used to provide a finally installed adjustment in the direction of arm extension and/or loading of the wiper element. The adapter 19 may be provided with a conventional rigidly associated knurled socket for installation on the knurled end of a conventional drive shaft or, as illustrated in FIG. 7 the adapter may be pivotally mounted on a socket 23 for installation on the knurled end 24 of the drive shaft projecting from the vehicle cowling 25 through the use of pivot pins 26 with the adapter being loaded as by torque spring 27 against a positive stop 27a in order to accommodate additional lifting of the wiper arm for service cleaning of the windshield beyond that permitted by deflection of the wiper arm per se. It will be noted that provision of the positive stop 27a together with an overload spring 27 permits the configuration of the spring arm to control the wiping pressure so that accurate tensioning of the overload spring 27 is not a critical requirement.

Referring to FIGS. 8 and 9 the preferred mounting for the rubber wiper element 18 is provided by molding a tapered sleeve 28 to slide over the end of the spring arm 18 which is provided with a retension shoulder 29, the sleeve 28 being integrally molded to accommodate the flexible wiping and following action of the conventional wiping edge 30.

From the description of the preferred embodiment it will be seen that a single leaf spring element has been provided to take the place of numerous bulky conspicuous complex parts as well as to simplify and reduce the cost of rubber wiping blade replacement.

I claim:

1. A combination windshield wiper pressure applying and pressure distributing arm construction for transmitting a predetermined movement and operating pressure from a pivotally mounted drive shaft to a windshield engaging wiper unit comprising a single substantially flexible leaf spring, a wiper element mounted directly along and extending substantially to one end of said leaf spring, said leaf spring having a desired predetermined operating configuration, said leaf spring having a free state continuous arc longitudinal gradual unidirectional curvature corresponding to that produced by deflection from a reverse uniform load applied along a predetermined portion of a similar leaf spring having a free state longitudinal configuration corresponding to said desired predetermined operating configuration, said portion comprising that of said leaf spring directly engaged by said wiper element, and an adapter hub for attaching said leaf spring to said drive shaft in a cantilever spring loaded condition extending substantially uniformly parallel to the lower edge of the windshield, said leaf spring being provided with a transverse crown extending from said adaptor hub up to and including said wiper element increasing its stiffness.

2. A windshield wiper arm as set forth in claim 1 wherein said uniform loading is applied normal to the surface of said leaf spring.

3. A windshield wiper arm as set forth in claim 1 wherein said leaf spring is tapered in width from a maximum at the end adjacent said pivotally mounted drive shaft to a minimum at the wiper attachment end.

4. A windshield wiper arm as set forth in claim 1 wherein said leaf spring is tapered with decreasing thickness along the wiper element mounting portion extending away from said drive shaft.

5. A windshield wiper arm as set forth in claim 1 wherein said desired predetermined operating configuration is substantially a straight line.

6. A windshield wiper arm as set forth in claim 1 wherein said desired predetermined operating configuration corresponds to a transverse curvature of the windshield.

7. A windshield wiper arm as set forth in claim 1 wherein said windshield wiper unit comprises a rubber element attached directly to the outer end of the said wiper arm.

8. A rubber wiper element for a windshield wiper arm as set forth in claim 1 characterized by a wiping portion underlying said leaf spring for engagement with the windshield and an integral connecting portion overlying the side edges of said leaf spring.

9. A rubber wiper element for a windshield wiper arm as set forth in claim 3 characterized by a wiping portion underlying said leaf spring for engagement with the windshield and an integral connecting portion overlying the side edges of said leaf spring, said connecting portiong being tapered in width to match the taper of said leaf spring.

References Cited

UNITED STATES PATENTS

| 2,613,385 | 10/1952 | Wylie | 15—250.35 X |
| 2,814,821 | 12/1957 | Wallis | 15—250.42 X |
| 3,156,940 | 11/1964 | Anderson | 15—250.42 |
| 3,192,551 | 7/1965 | Appel | 15—250.36 |
| 3,387,316 | 6/1968 | Pearse | 15—250.36 |

FOREIGN PATENTS 1,217,680  12/1959  France.

PETER FELDMAN, Primary Examiner

U.S. Cl. X.R.

15—250.42